United States Patent [19]

Baghdadchi

[11] Patent Number: 4,721,754

[45] Date of Patent: Jan. 26, 1988

[54] POLYHYDROXYBUTADIENE AND AMINE TERMINATED POLYBUTADIENE BLENDS

[76] Inventor: Jamil Baghdadchi, 219 Sugartown Rd., Wayne, Pa. 19087

[21] Appl. No.: 888,653

[22] Filed: Jul. 23, 1986

Related U.S. Application Data

[63] Continuation-in-part of Ser. No. 789,996, Oct. 22, 1985, abandoned.

[51] Int. Cl.⁴ ............................................. C08G 18/62
[52] U.S. Cl. .................................. 525/194; 525/236; 528/61; 528/75; 252/182
[58] Field of Search .................. 525/194, 236; 528/61, 528/75; 252/182

[56] References Cited

U.S. PATENT DOCUMENTS

| | | | |
|---|---|---|---|
| 3,333,015 | 7/1967 | Burke | 526/319 |
| 3,673,168 | 6/1972 | Burke | 525/191 |
| 3,714,110 | 1/1973 | Verdol et al. | 528/75 |
| 3,796,762 | 3/1974 | Verdol et al. | 526/319 |
| 3,987,012 | 10/1976 | Statton | 528/75 |

Primary Examiner—Maurice J. Welsh
Attorney, Agent, or Firm—D. E. McCaslin; R. L. Taylor

[57] ABSTRACT

Compositions comprising blends of polyhydroxybutadiene homopolymers and amine terminated polybutadienes useful for the preparation of polyurea and/or polyurethane elastomers, sealants, coatings and binders are disclosed as well as a process for the preparation of the polyurea/polyurethanes.

11 Claims, No Drawings

POLYHYDROXYBUTADIENE AND AMINE TERMINATED POLYBUTADIENE BLENDS

CROSS REFERENCE TO RELATED APPLICATIONS

This Application is a continuation-in-part application of Jamil Baghdadchi application Ser. No. 789,996, filed Oct. 22, 1985, entitled Polyhydroxybutadiene and Amine Terminated Polybutadiene Blends now abandoned.

FIELD OF THE INVENTION

The present invention relates to novel blend of a polyhydroxybutadiene homopolymer and a wide variety of amine terminated polybutadienes. Upon reaction, with organic polyisocyanates the blends are useful for the preparation of polyureas and/or polyurethanes having improved physical and mechanical properties while providing an increase in reaction rates and allowing for the elimination of catalysts.

BACKGROUND OF THE INVENTION

It is known that hydroxyl-terminated polybutadiene (polyhydroxybutadiene) as hereinafter described can provide polyurethanes having good hydrolytic stability, chemical resistance and a wide range of mechanical properties. It has been discovered that these properties can be improved or increased by employing the novel polyhydroxybutadiene/amine terminated polybutadiene blends of the present invention to prepare polyurethanes and/or polyureas. The blends of polyhydroxybutadiene/amine terminated polybutadiene provide the following advantages when reacted with isocyanates (a) the polyurea/polyurethanes prepared therefrom are thermally more stable and generally tougher than known polyurethanes, (b) do not require catalysts when reacted with the organic polyisocyanates, (c) provide a faster cure time and (d) provide better overall physical and mechanical properties than polyhydroxybutadiene alone.

Processes for the preparation of the polyhydroxybutadienes employed in the blends of the instant invention are known in the art, and may be prepared, for example, by the methods described in U.S. Pat. Nos. 3,333,015, 3,673,168 and 3,796,762, all incorporated herein by reference.

The amine terminated polybutadienes employed in the blends of the instant invention may be prepared as set forth in the co-pending application Ser. No. 06/745039 filed June 17, 1985 in the name of Harry R. Hinney and Jamil Baghdadchi entitled Process for the Preparation of Amine Terminated Polybutadiene, which application is incorporated herein by reference.

Applicant is not aware of any truly pertinent prior art that is deemed to be anticipatory or suggestive of the concept of the present invention.

DETAILED DESCRIPTION OF THE INVENTION

In accordance with the present invention, novel compositions, which when reacted with organic di- or polyisocyanates, are useful for the preparation of polyurea and/or polyurethane elastomers, sealants, coatings and binders, are provided which comprise a blend of from about 2 to about 98 parts by weight, based on the total weight of the composition, of a polyhydroxybutadiene homopolymer having the formula:

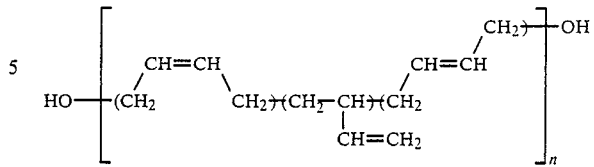

wherein n is an integer of from about 5 to about 1500, and from about 98 to about 2 parts by weight, based on the total weight of the composition, of an amine terminated polybutadiene having the formula:

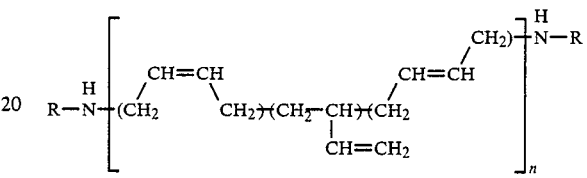

wherein R is hydrogen, a straight or branched chain alkyl group containing from 1 to 10 carbon atoms or a substituted or unsubstituted aryl or aralkyl group containing one or more benzenoid rings which may be fused or joined by single valency bonds and n is an integer of from about 5 to about 1500.

The amine terminated polybutadiene employed in the blends of the present invention are secondary or primary amine terminated polybutadiene having the above noted formula wherein R is hydrogen, a straight or branched chain alkyl group containing from 1 to 10 carbon atoms or a substituted or unsubstituted aryl or aralkyl group containing one or more benzenoid rings which may be fused or joined by single valency bonds and n is an integer of from about 5 to 1500, may be prepared by a two step process which comprises (1) reacting at a temperature of from about 15° C. to 150° C., optionally in the presence of a solvent, a polyhydroxybutadiene homopolymer with an alkane-or arenesulfonyl chloride or fluoride in the presence of a tertiary amine catalyst (which will react with generated hydrogen chloride to give a tertiary amine hydrochloride) to form an alkane-or arene-sulfonate terminated polybutadiene and (2) reacting the formed alkane or arenesulfonate terminated polybutadiene in situ, or after removal from the reaction system with or without purification, at a temperature of from about 25° C. to 200° C. preferable 50° C. to 110° C. with a primary amine to form a secondary amine terminated polybutadiene or with ammonia at an initial ammonia pressure which will provide a stoichiometric amount, and preferably an excess of ammonia, to react with the sulfonate compound to form a primary amine terminated polybutadiene. Generally the ammonia pressures will range between about 200 psig and 500 psig. Optionally the process is carried out in the presence of an inert solvent.

The polyhydroxybutadiene homopolymers employed in the blends of the present invention will have the formula:

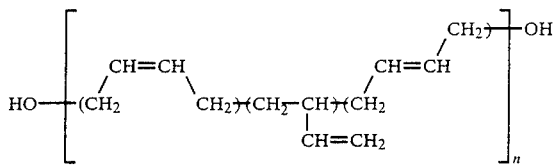

wherein n is an integer of from about 5 to about 1500 and a viscosity range of from about 20 to 300 or up to about 550 poises at 30° C. Preferably the homopolymers have a viscosity of about 35 to 60 or up to about 190 to 260 poises. Thus, the polyhydroxybutadiene homopolymers are liquid or semi-solids flowable, at least when subjected to moderate pressure, at ambient temperatures or at temperatures up to about 200° C. The hydroxyl-containing butadiene homopolymers will have molecular weights in the range of about 400 to 25,000 or higher as determined by cryoscopic, ebullioscopic or osomometric methods.

The polyhydroxybutadiene (hydroxy-containing butadiene homopolymers) employed in this invention differ from diene polymers known to be telechelic and/or hydroxy-containing in that the majority of unsaturation in the former is in the main hydrocarbon chain and in that the hydroxy components are in predominantly terminal positions on the main hydrocarbon chain and are predominantly primary and allylic in configuration. Ordinarily, at least about 1.8, often at least about 2 or more, frequently 2.1 to 2.8 and up to about 3 or more hydroxyl groups are present on the average per polymer molecule. Since these hydroxyl groups are predominantly primary, terminal and allylic in structure, with approximately two of the hydroxyl groups being at terminating positions on the main carbon chain, the polymers are highly reactive.

The dienes which are employed to make the polyhydroxybutadienes include the unsubstituted, 2-substituted or 2,3-disubstituted 1,3-dienes of 4 up to about 12 carbon atoms. The diene preferably has up to 6 carbon atoms and the substituents in the 2- and/or 3-position may be hydrogen, alkyl, generally lower alkyl, e.g., of 1 to 4 carbon atoms, aryl (substituted or unsubstituted), halogen, nitro, nitrile, etc. Typical dienes which may be employed are 1,3-butadiene, isoprene, chloroprene, 2-cyano-1, 3-butadiene, 2,3-dimethyl-1,3-butadiene, 2phenyl-1, 3-butadiene, 2-methyl3-phenyl-1,3-butadiene, etc.

Although polyhydroxybutadienes of the above-described type, averaging more than one predominantly primary hydroxyl per molecule, say about 1.8 to 3 or more per molecule, may be employed in the process of this invention, they preferably have an average of at least 2 or more or about 2.1 to 2.4 up to 2.8 hydroxyl groups per molecule and the hydroxyl groups are predominantly in terminal allylic positions on the main, generally longest, hydrocarbon chain of the molecule. By "allylic" configuration is meant the alpha-allylic grouping of allylic alcohol; that is, the terminal hydroxyls of the intermediate polymer are attached to a carbon adjacent to a double-bond carbon.

The ratio of cis-1,4 and trans-1,4 and 1,2-vinyl unsaturation which occurs in the diene polymers employed in this invention, the number and location of the hydroxyl groups and the molecular weight of the polymers can be a function of polymerization temperature and the type of addition polymerization system employed in forming the polymer. It has been found that diene polymers of the desired configuration can be obtained using hydrogen peroxide as the catalyst for polymerization in a mutual solvent system. This free-radical addition polymerization usually takes place in solution at a temperature above about 100° C. to 200° C.

The reaction to form the polyhydroxybutadiene preferably takes place in a mutual solvent system; that is, one which dissolves both the diene monomer and the hydrogen peroxide. Suitable solvents include isopropanol, methanol, sec-butanol, acetone, n-butanol, n-propanol, methyl ethyl ketone and the like, saturated alcohols or ketones preferably alkanols, having 2 to about 12 carbon atoms. The $H_2O_2$ solvent system is found to supply hydroxyl groups and the catalytic and solvent effects needed to produce the diene polymers of desired chemical and physical characteristics. In such a polymerization system the alcohol or ketone serves as a solvent for the peroxide and as a solvent or diluent for the diene monomer and is used in an amount suitable to promote adequately rapid but controllable polymerization of the monomer material in the solution to form the diene polymers. The solvent will be free of any group which would interfere with the production of the desired diene polymer. Saturated alcohols are preferred and often those having about the same carbon atom content as the diene monomer will be found most useful. Thus, propanol or isopropanol is often used in butadiene polymerization. The $H_2O_2$ solvent system may also contain ethers, alcohol-ketones, alcohol-ethers and alcohol-esters which are miscible in water in all proportions and which do not contain polymerizable carbon-to-carbon unsaturation or otherwise interfere with polymerization or enter into the product. The peroxide material may be used in amounts of about 1 percent to 15 percent of the reaction mixture to assure a low molecular weight addition polymer product having more than two hydroxyl groups per molecule.

Typical of the polyhydroxybutadienes employed in the blends with an amine terminated polybutadiene and used to react with organic polyisocyanates to form polyureas and/or polyurethanes are those sold commercially for example by the ARCO Chemical Company, a division of Atlantic Richfield Company, under the trademark "Poly bd" R-45T or R-45M.

The blends of the instant invention are prepared by physically mixing the desired proportions of polyhydroxybutadiene and amine terminated polybutadiene generally at ambient temperature although temperatures as high as about 100° C. may be used.

The organic polyisocyanates employed to react with the polyhydroxybutadiene/amine terminated polybutadiene blends at temperatures of from about 0° C. to about 50° C. preferably about 25° C. to about 35° C. according to the present invention include aliphatic, alicyclic and aromatic polyisocyanates characterized by containing two or more isocyanate groups. Such polyisocyanates include the diisocyanates and higher functionality isocyanates, particularly the aromatic polyisocyanates. Mixtures of polyisocyanates may be used which for example are the crude mixtures of di- and higher functionality polyisocyanates produced by phosgenation of anilineformaldehyde condensate or as prepared by the thermal decomposition of the corresponding carbamates dissolved in a suitable solvent as described in U.S. Pat. Nos. 3,962,302 and 3,919,279 both known as crude MDI or PMDI. The organic polyisocyanate may be isocyanate-ended prepolymers made by reacting under standard known conditions, an excess of a polyisocyanate with a polyol which on a polyisocyanate to polyol basis may range from about 20:1 to 2:1 and include for example polyethylene glycol, polypropylene glycol, diethylene glycol monobutyl ether, ethylene glycol monoethyl ether, triethylene glycol, etc. as well as glycols or polyglycols partially esterified with carboxylic acids including polyester polyols and polyether polyols. The organic polyisocyanates or isocyanate terminated prepolymer may also be used in the form of an aqueous emulsion by mixing such materials with water in the presence of an emulsifying agent. The isocyanates may also contain impurities or additives such as carbodiimides, isocyanurate groups, urea, hydrolyzable chlorides and biurets as well as certain release agents. Illustrative of such di- or polyisocyanates which may be employed include, for example, toluene-2,4- and 2,6-diisocyanates or mixtures thereof, diphenylmethane-4,4'-diisocyanate (a solid) and diphenylmethane-2,4'-diisocyanate (a solid) or mixtures of same, i.e., containing about 10 parts by weight 2,4'- or higher, which are liquid at room temperature, polymethylene polyphenyl isocyanates, naphthalene-1,5-diisocyanate, 3,3'-dimethyl diphenylmethane-4,4diisocyanate, triphenylmethane triisocyanate, hexamethylene diisocyanate, 3,3'-ditolylene-4, 4-diisocyanate, butylene 1,4-diisocyanate, octylene-1,8-diisocyanate, 4-chloro-1,-phenylene diisocyanate, 1,4- 1,3-and 1,2-cyclohexylene diisocyanates and in general the polyisocyanates disclosed in U.S. Pat. No. 3,577,358. The preferred polyisocyanates are the diphenylmethane diisocyanate 2,4' and 4,4' isomers including the 2,2' isomer and the higher functional polyisocyanate and polymethylene polyphenyl isocyanate mixtures, which may contain from about 20 to 85 weight percent of the diphenylmethane diisocyanate isomers. Typical of the isocyanates employed with the blends to prepare the polyurea/polyurethanes are sold commercially for example as "Isonate 143-L" by the Upjohn Company which is a carbodiimide modified diphenylmethane diisocyanate. In general the organic polyisocyanates will have a molecular weight in the range of about 100 and 10,000 and will be employed in amounts of from about 10 to 50 parts by weight preferably 15 to 25 parts by weight based on the polyisocyanate-blend mixture. Excess amounts of the isocyanates may be employed if desired.

The blends of the present invention generally do not require any catalyst when reacted with the polyisocyanates. However, if necessary suitable polyurea/polyurethane catalysts which are compatible with the blend system may be used. The amount of catalyst used may be from about 0.02% to about 2% preferably from about 0.05% to about 1% by weight based on the weight of the polyhydroxybutadiene/amine terminated polybutadiene blend. Representative catalysts include, for example, monoalkoxy and neoalkoxy titanates, organometallic compounds and tertiary amines such as isopropyl tri (N-ethylaminoethyamino) titanate, tetra (2-diallyloxymethyl-1-butoxy titanium, di(ditridecyl) phosphite, tetramethylaminopropyl isopropylamine, 1,4-diazabicyclo(2,2,2) octane (DABCO), stannous octoate, 1,3-Bis (dimethylamino)-2-propanol and the like.

When the blends of the present invention are reacted with the di- or polyisocyanates, chain extenders, if desired, may be employed in varied amounts over any convenient range depending on the particular polyisocyanate employed and the composition of the polyhydroxybutadiene/amine terminated polybutadiene. In general, from about 1 to about 15 parts by weight for blends having up to about 80% amine terminated polybutadiene may be added. It is most convenient to use about 1 to 3 parts by weight for systems reacted, for example with carbodiimide modified diphenylmethane diisocyanate and up to about 10 parts by weight with less reactive isocyanates such as isophorondiisocyanate and crude diphenylemethane diisocyanate. Representative chain extenders which may be employed include, for example, 1-methyl-3,5-diethyl-2,6-diaminobenzene, 1-methyl-3, 5-diethyl-2, 4-diaminobenzene, 2,4-and 2,6-diaminotoluenes, 1,3,5-triethyl-2,6-diaminobenzene, 3,5,3',5'-tetraethyl-4,4'diaminodiphenylmethane, 4,4'-diaminodiphenylmethane, 1,3-pheny-lenediamine, 1,4-phenylenediamine, triphenylmethane-4, 4'4''-triamine, 2,4-diaminomesitylene, 4-aminophenyl sulfone, methylenebis-(dipropylaniline), mixtures thereof and the like.

The amine terminated polybutadienes are miscible in all proportions with polyhydroxybutadiene such as for example "Poly bd" R-45HT, at all operating temperatures. High speed mixing or reaction injection molding (RIM) can conveniently employ blends in any accessible range. Elastomer sheets prepared from blends exhibit only a 1 to 5% loss in physical and mechanical properties upon storage at 120° C. as compared to sheets prepared with 100% "Poly bd" R45HT. All blends are storage stable at ambient temperatures. p The following examples are provided to illustrate the invention in accordance with the principles of this invention but are not to be construed as limiting the invention in any way except as indicated by the appended claims.

EXAMPLE 1

A resin kettle was charged with 100 g. of a 50:50 blend of a polyhydroxybutadiene ("Poly bd" R-45HT-Arco Chemical Company) and a cyclohexylamine terminated polybutadiene. The mixture was stirred and briefly heated to 100° C. at 5 mm Hg. for 30 minutes to degas the mixture. The mixture was cooled to room temperature and 11.94 g. (NCO/OH, NH=1.08) of a carbodiimide modified diphenylmethane diisocyanate (Isonate 143-L—Upjohn Company) added without catalyst and mixed vigorously for 3 minutes under vacuum. The resultant polyurea/polyurethane resin is poured into a preheated 1/16" mold which was treated with a zinc stearate release agent. The molds were heated under pressure for 45 minutes at 80° C. and elastomer sheets postcured for 65 hours at 49° C. Elastomer sheets were tested for tensile, elongation, tension set, tear and Shore hardness "A" using the method described in ASTM D-412, giving a tensile (psi) of 538, elongation % of 407, tension set of 0, tear (pli) of 50 and Shore "A" Hardness of 57.

EXAMPLE 2

The procedure of Example 1 was repeated employing 100% polyhydroxybutadiene ("Poly bd R45HT) and various percentages polyhydroxybutadiene/cyclohexylamine terminated polybutadiene (ATPBD) blends. No catalysts were employed and all runs were cured with "Isonate 143 L". The physical test data is set forth in Table 1 below.

TABLE 1

|  | 100% R45HT | 95R45HT 5ATPBD* | 90R45HT 10ATPBD* | 80R45HT 10ATPBD* | 60R45HT 40ATPBD* |
| --- | --- | --- | --- | --- | --- |
| Tensile, (psi) | 179 | 221 | 370 | 401 | 447 |
| Elongation, % | 101 | 150 | 240 | 257 | 381 |
| Tension Set | 4 | 0.5 | 1 | 0 | 0 |
| Tear, (pli) | 16 | 35 | 54 | 54 | 57 |
| Hardness (Shore "A") | 53 | 51 | 47 | 47 | 50 |

*ATPBD — cyclohexylamine terminated polybutadiene

EXAMPLE 3

Elastomer sheets were prepared according to the procedure of Example 1 using 100 g. of various blends of polyhydroxybutadiene and cyclohexylamine terminated polybutadiene (ATPBD) including 2 g. of diethyltoluene diamine chain extender which also acts as catalyst. The mixture was stirred and heated to 100° C. at 3–5 mm Hg for 45 minutes then cooled to room temperature. To the blend was added the appropriate amounts of diphenylmethane diisocyanate ("Isonate 143-L") and the mixture stirred for 2 minutes and poured into the molds. The physical test data showing further improvements is set forth in Table 2.

TABLE 2

|  | 100% R45HT | 90R45HT 10ATPBD | 75R45HT 25ATPBD | 60R45HT 40ATPBD |
| --- | --- | --- | --- | --- |
| Tensile, (psi) | 230 | 410 | 690 | 797 |
| Elongation, % | 154 | 300 | 380 | 407 |
| Tension Set | 2 | 0 | 0 | 0 |
| Tear, (pli) | 20 | 40 | 64 | 67 |
| Hardness (Shore "A") | 53 | 51 | 54 | 55 |
| *"Isonate 143-L" (g.) | 15.27 | 15.1 | 15.3 | 15.67 |

*Amount of diisocyanate ("Isonate 143-L") added to the various blends

EXAMPLE 4

A resin kettle was charged with 100 g. of a 50:50 blend of polyhydroxybutadiene R-45HT and n-butylamine terminated polybutadiene resin. The mixture was stirred and heated to 100° C. at 1–2 mm Hg. for 30 minutes to degas the mixture. The mixture was then cooled to room temperature and 11.93 g. (NCO/OH, NH=1.08) of carbodiimide modified diphenylmethane diisocyanate ("Isonate 143-L") added. The mixture was stirred for 2 minutes under vacuum and poured into release agent treated molds as described in Example 1. The resulting elastomeric sheets were tested according to ASTM method D-412 to give a tensile (psi) of 507, elongation % of 418, a tension set of 0, tear (pli) of 57 and hardness Shore "A" of 51.

EXAMPLE 5

The procedure of Example 4 was repeated employing 100% polyhydroxybutadiene ("Poly bd" R45HT) and various percentages of polyhydroxybutadiene/n-butyamine terminated polybutadiene (ATPBD) blends. No catalysts or chain extenders were employed and all runs were cured with "Isonate 143-L" as set forth in Example 1. The physical test data is set forth in Table 3 below.

TABLE 3

|  | 100% R45HT | 90R45HT 10ATPBD | 75R45HT 25ATPBD | 35R45HT 65ATPBD |
| --- | --- | --- | --- | --- |
| Tensile, (psi) | 230 | 378 | 413 | 693 |
| Elongation, % | 154 | 229 | 267 | 439 |
| Tension Set | 2 | 1 | 0 | 0 |
| Tear, (pli) | 20 | 50 | 51 | 59 |
| Hardness (Shore "A") | 53 | 56 | 45 | 60 |

EXAMPLE 6

This example demonstrates the use of a less reactive diisocyanate, diisophorondiisocyanate, blend with polyhydroxybutadiene ("Poly bd" R45HT) and a chain extender. 100 g of a 25:75 blend of "Poly bd" R45HT and aniline (phenylamine) terminated polybutadiene respectively along with 5 g. of diethyltoluenediamine was degassed as in Example 4 and cooled to room temperature. 14.23 g. diisophorondiisocyanate (NCO/OH,NH=1.05) was added and the mixture stirred for 3 minutes under vacuum. The resultant polyurea/polyurethane was poured into a preheated 1/16" release agent treated mold and the mold heated and cured under pressure for 45 minutes at 80° C.

EXAMPLE 7

Example 4 was repeated except that the chain extender was replaced with 0.25 g. of isopropyl tri(N-ethylamino-ethyamino) titanate catalyst. The prepolymer cured much slower (2 hours at 80° C.) than that of Example 6.

EXAMPLE 8

The procedure of Example 4 was repeated employing various blends of polyhydroxybutadiene ("Poly bd" R45HT) and an aniline (phenylamine) terminated polybutadiene (ATPBD). No catalyst or chain extender was employed and all runs were cured with a carbodiimide modified diphenylmethane diisocyanate ("Isonate 143-L"). The physical test results are given in Table 4 below.

TABLE 4

|  | 90R45HT 10ATPBD | 75R45HT 25ATPBD | 40R45HT 60ATPBD | 20R45HT 80ATPBD | 10R45HT 90ATPBD |
| --- | --- | --- | --- | --- | --- |
| Tensile, (psi) | 350 | 398 | 430 | 670 | 811 |
| Elongation, % | 210 | 239 | 400 | 432 | 501 |
| Tension Set | 1 | 0 | 0 | 0 | 0 |
| Tear, (pli) | 52 | 55 | 57 | 63 | 64 |
| Hardness (Shore "A") | 50 | 52 | 59 | 64 | 70 |

EXAMPLE 9

100 g. of a 20:80 blend of a cyclohexylamine terminated polybutadiene and polyhydroxylbutadiene ("Poly bd"R45HT) resin was heated under vacuum at 100° C. for 30 minutes to degas same. 0.10 g. of 1,3-bis(dimethylamino)-2-propanol catalyst was added and the mixture stirred for 3 minutes and 11.08 g. "Isonate 143-L" added with stirring for 4 minutes. The reaction mixture was poured into a zinc stearate treated mold and pressure cured for 25 minutes at 80° C. providing faster cure time with the added catalyst.

EXAMPLE 10

Elastomer sheets were prepared according to the procedure of Example 1 using 100 g of various percentages of polyhydroxylbutadiene ("Poly bd" R45HT) and cyclohexylamine terminated polybutadiene (ATPBD) blends. No catalysts were employed and all runs were cured with "Isonate 143L". The physical test data is set forth in Table 5 below.

TABLE 5

|  | 98 R45HT 2 ATPBD | 97 R45HT 3 ATPBD | 96 R45HT 4 ATPBD |
| --- | --- | --- | --- |
| Tensile, (psi) | 197 | 205 | 213 |
| Elongation, % | 107 | 117 | 120 |
| Tension Set | 1.1 | 0.9 | 0.7 |
| Tear, (pli) | 28 | 29.5 | 33 |
| Hardness (Shore A) | 49 | 49.5 | 50 |

EXAMPLE 11

The procedure of Example 1 was repeated employing 95 g of cyclohexylamine-terminated "Poly bd" resin and 5 g of hydroxy-terminated "Poly bd" R-45HT resin. The resulting elastomeric sheets were tested according to ASTM method D412 to give a tensile strength (psi) of 1200, elongation % of 595, a tension set of 0, tear (pli) of 65 and hardness shore "A" of 70.

EXAMPLE 12

The procedure of Example 1 was repeated employing 98 g of phenylamine-terminated "Poly bd" resin and 2 g of hydroxy-terminated "Poly bd" R-45HT resin. The resulting elasatomeric sheets were tested to give a tensil (psi) of 1250, elongation % of 612, a tension set of 0, tear (pli) of 67 and shore "A" hardness of 71.

I claim:

1. A composition useful for the preparation of polyurea and/or polyurethane elastomers, sealants, coatings and binders which comprises a blend of
   (a) about 2 to about 98 parts by weight, based on the total weight of the composition, of a polyhydroxybutadiene homopolymer having the formula

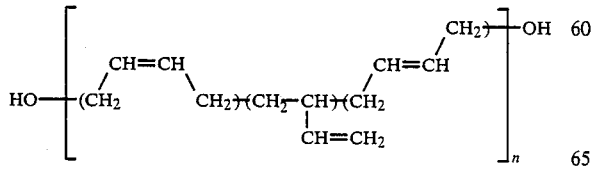

wherein n is an integer of from about 5 to about 1500, and (b) about 98 to about 2 parts by weight based on the total weight of the composition of an amine terminated polybutadiene having the formula

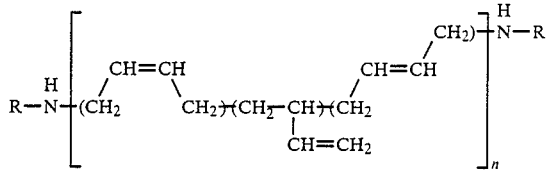

wherein R is hydrogen, a straight or branched chain alkyl group containing from 1 to 10 carbon atoms or a substituted or unsubstituted aryl or aralkyl group containing one or more benzenoid rings which may be fused or joined by single valency bonds and n is an integer of from about 5 to about 1500.

2. A composition according to claim 1 wherein the amine terminated polybutadiene is a cyclohexylamine terminated polybutadiene.

3. A composition according to claim 1 wherein the amine terminated polybutadiene is a phenylamine terminated polybutadiene.

4. A composition according to claim 1 wherein the amine terminated polybutadiene is an n-butylamine terminated polybutadiene.

5. A process for the preparation of a polyurea and/or polyurethane which comprises reacting from about 10 to about 50 parts by weight, based on the total reaction mixture, an organic di- or polyisocyanate at a temperature of from about 0° C. to about 50° C., with a composition which comprises a blend of
   (a) from about 2 to about 98 parts by weight, based on the total weight of the composition, of a polyhydroxybutadiene homopolymer having the formula

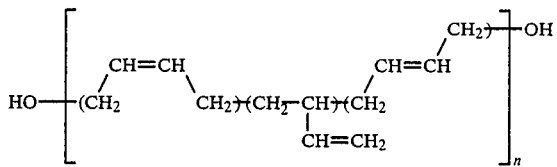

wherein n is an integer of from about 5 to about 1500, and (b) from about 98 to about 2 parts by weight, based on the total weight of the composition, of an amine terminated polybutadiene having the formula:

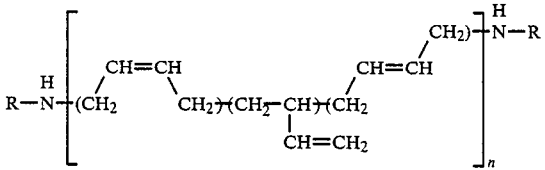

wherein R is hydrogen, a straight or branched chain alkyl group containing from 1 to 10 carbon atoms or a substituted or unsubstituted aryl or aralkyl group containing one or more benzenoid rings which may be fused or joined by single valency bonds and n is an integer of from about 5 to about 1500.

6. A process according to claim 5 wherein the reaction is carried out at a temperature of from about 25° C. to about 35° C.

7. A process according to claim 5 wherein diphenylmethane diisocyanate is employed in the reaction.

8. A process according to claim 5 wherein the amine terminated polybutadiene is a cyclohexylamine terminated polybutadiene.

9. A process according to claim 5 wherein the amine terminated polybutadiene is a phenylamine terminated polybutadiene.

10. A process according to claim 5 wherein the amine terminated polybutadienne is an n-butylamine terminated polybutadiene.

11. A process according to claim 5 wherein from about 15 to about 25 parts by weight of di- or polyisocyanate is employed.

* * * * *

UNITED STATES PATENT AND TRADEMARK OFFICE
CERTIFICATE OF CORRECTION

PATENT NO.  : 4,721,754
DATED       : January 26, 1988
INVENTOR(S) : Jamil Baghdadchi It is certified that error appears in the above—identified patent and that said Letters Patent is hereby corrected as shown below: Title page:

[73] Assignee:  PONY INDUSTRIES, INC.
                New York, New York

Signed and Sealed this

Sixth Day of December, 1988

Attest:

DONALD J. QUIGG

Attesting Officer    Commissioner of Patents and Trademarks